United States Patent Office 3,245,776
Patented Apr. 12, 1966

3,245,776
FERTILIZER COMPOSITION COMPRISING CHELATED MICRONUTRIENTS AND POLYURETHANE FOAM
Martin Rubin, 3218 Pauline Drive, Chevy Chase, Md.
No Drawing. Filed June 9, 1964, Ser. No. 373,826
7 Claims. (Cl. 71—1)

This application is a continuation-in-part of prior application, Serial Number 147,049 filed October 23, 1961, now abandoned.

This invention relates to plant growth and is particularly concerned with a novel and improved composition for supplying trace metal micronutrients to plants.

More and more, it has become appreciated that the so-called trace elements of copper, iron, zinc, boron, molybdenum, and the many others which are important, often vital, to the proper growth of many forms of plant life must be supplied to cultivated plants else quality or quantity (often both) of the crop suffers. Intensive cultivation of the sort practiced in modern agriculture rapidly depletes the trace elements normally present in the soil and available to the plant below plant requirements. Widespread shortages of these micronutrients exist. Most commonly, the need for any one crop in a locality is for a single trace element, e.g., zinc for corn and fruit trees; iron for citrus fruits; copper for some types of grains.

As a more practical matter the basic need is for a composition which slowly releases small quantities of a single trace metal to the plant throughout the growing season. Such a composition would advantageously be usable for a specific plant crop in a localized geographic area. It could be applied alone or, if desired, as part of a prepared fertilizer composition.

The principal object of the instant invention is to provide a sustained release composition for certain trace metals.

Briefly, the instant invention comprises a polyurethane foam composition containing at least 25% by weight thereof of an agricultural metal chelate. Up to about 75% may be incorporated.

Agricultural metal chelates may be defined as a chelate of a trace element metal, such chelatable metals specifically including copper, manganese, zinc, iron, cobalt. The agricultural use for these trace element metals has been widely recognized by the art and need not be elaborated upon here. Similarly, the chemical and physical properties of these metals which permit their chelation is well known and need not be elaborated upon here. Indeed, many agricultural metal chelates have been made available commercially for alleviation of micronutrient shortages.

In terms of the instant invention, the preferred chelating compounds are synthetic amino acids, particularly the ethylene diamine derivatives, notably ethylenediaminetetracetic acid, N-$\beta$ hydroxy ethyl ethylenediaminetriacetic acid, N,N' diortho hydroxy phenyl acetic acid ethylene diamine, ethylene bis (alpha-imino-ortho-hydroxy-phenyl acetic acid)-monoamide, dihydroxyethyl ethylene diamine diacetic acid and nitrilo triacetic acid, and diethylene triamine pentacetic acid. The iron and zinc chelates of these compounds are particularly well adapted for agricultural use as sustained release suppliers of these micronutrient trace materials, and constitute the ultimately preferred chelates for practice of this invention.

It has been found that rigid polyurethane foams may be conveniently prepared in an intimate admixture with agricultural metal chelates. In such formulations the polyurethane foam forms a protective cover around the metal chelate.

While any rigid or even non-rigid polyurethane foam may be employed for the practice of the instant invention, the diverse nature and physical character of the foams which can be made, permit, advantageously, modification in the rate which the metal is released for plant utilization. Thus, by selection of the polyurethane composition and control of the foaming, it is possible to predetermine the rate of the metal chelate released into the surrounding medium. It is believed that this aspect of the preparation is related to the nature of the cellular characteristics of the polyurethane. Closed cell foams such as can be prepared by methods well known in the polyurethane art yield a material of slow release characteristics. In contrast, open cell polyurethanes provide a more rapidly available active ingredient. In addition to the control of product characteristics through the nature of the polyurethane foam, the product characteristics are also influenced by the particle size of the final polyurethane foam composition.

As is well known to the art, formation of polyurethane foams involves reaction between a polyfunctional organic isocyanate and a high molecular weight polyol which may contain terminal carboxyl groups in addition to the terminal hydroxyl groups.

Chain-extending urethane linkages are formed by reaction between isocyanate groups and hydroxyl groups. Chain-extending amide linkages may be formed by reaction between isocyanate groups and carboxyl groups with simultaneous in situ evolution of carbon dioxide gas. Chain-extending urea linkages may also be formed by reaction between two isocyanate groups and one molecule of water with simultaneous in situ evolution of carbon dioxide gas. The carbon dioxide gas evolved by reaction between isocyanate groups and water and/or carboxyl groups expands to form the cell structure of the foam.

The present invention is applicable to polyurethane foams in which a reaction takes place between water and isocyanate groups to evolve carbon dioxide which expands to form the cell structure of the foam. Thus, it is applicable to the so-called "single shot" method in which the poly-isocyanate is added to a mixture of polyol and chelate, additional water if necessary, and which mixture may also contain a catalyst and an emulsifier. The invention may also be employed in the so-called "prepolymer" method in which a polyisocyanate and polyol are first reacted to obtain a prepolymer which is thereafter combined with the chelate, additional water if necessary, and usually a catalyst and emulsifier. The latter method is particularly suitable with polyethers such as polyalkylene glycols. The invention may also be practiced in continuous foam producing machines wherein separate streams of the polyol, polyisocyanate, catalyst, chelate, additional water if necessary, and emulsifier or suitable mixtures thereof as noted above, are simultaneously injected into a mixing chamber which discharges into a mold. Standardized pastes or mixtures containing the chelate, additional water if necessary, and emulsifier or these together with the catalyst may be prepared and used advantageously.

The present invention is applicable also to polyurethanes formulated with other foaming expedients besides water. Thus, volatile ingredients like the fluorinated hydrocarbon refrigants (Freon) may be incorporated into the formulation to serve as the foaming agent.

The physical and chemical properties of the polyurethane foams may be varied, as is well known, by varying the formulation, processing procedure and reaction conditions. Polyisocyanates suitable for making foams include, among many others, tetramethylene diisocyanate, hexamethylene diisocyanate, m-phenylene diisocyanate, 2,4- and 2,6-tolylene diisocyanates, 3,3'-ditolylene-4,4'- diisocyanate, methylene di-p-phenyleneisocyanate, 1,5-naphthalene diisocyanate, and a triisocyanate prepared by reacting 3 mols of tolylene diisocyanate with one mol of hexanetriol.

Polyols suitable for making foams include (1) trihydric alcohols such as castor oil; (2) polyalkylene ether glycols prepared from ethylene, propylene or tetramethylene glycols, including polybutylene glycol of molecular weight 3,000 derived from 1,4-butylene glycol, known commercially as Teracol 30; and (3) polyesters which are the reaction products of dihydric alcohols and dicarboxylic acids, for example polyesters prepared by copolymerizing a dicarboxylic acid, such as adipic, phthalic, sebacic succinic, or oxalic acid with a glycol or polyalkylene glycol such as ethylene, diethylene, propylene and butylene glycos or obtained by copolymerizing ethylene glycol or glycerin with a mixture of phthalic and adipic acids; the last mentioned polyesters are alkyd resins.

In the production of flexible foams, from about 25 to 50 parts of diisocyanate are mixed per 100 parts of the polyol. For rigid foams, from about 60 to 225 parts of diisocyanate are employed per 100 parts of the polyol. In general, the lighter foams require more diisocyanate than the denser foams. It will be understood that the invention is not limited to these proportions of reactants.

Catalysts and emulsifiers are generally used to prepare low density flexible foams from polyester diols, but are used less often to prepare foams from polyether diols and alkyd resins. Preferred catalysts are the basic tertiary amine catalysts, such as N,N-diethylethanolamine, N-methyl morpholine, N,N-dimethylcyclohexylamine, and N-ethyl morpholine. The usual amount of the catalyst may be employed; in general up to 5% of catalyst based on the polyol will give satisfactory results.

Preferred emulsifiers are of the nonionic type such as a monoether of a polyethylene glycol with an alkyl phenol, blends of polyalcohol carboxylic acid esters and oil soluble sulfonates (Witco 77), polyethylene glycol ricinoleate (Emulphor EL-719), sorbitan monolaurate (Span 20), and poly oxy alkylene derivatives of sorbitan monolaurate (e.g., Tween 20 and Tween 80). Anionic emulsifiers such as sodium dioctyl sulfo succinate may also be used. In general the amount of emulsifier required does not exceed 10% based on the polyol.

The amount of water present where water is employed for foaming, including that introduced by the chelate should be enough to react with the isocyanate to liberate sufficient gas to produce a foam of desired physical characteristics, e.g., density. The more water used, in general, the lower the density of the foam. From 0.5 to 10% of water based on the weight of isocyanate will generally give good results.

The temperatures of mixing the constituents and curing are those commonly used in the formation of polyurethane foams. The mixing of the constituents may be carried out under atmospheric conditions. The curing temperature will, of course, depend on the particular formulation. Typical curing conditions are given in the examples.

Polyurethane foams prepared, for example, by the methods of the examples are readily comminuted into small granular particles by any of many conventional means such as a hammer mill, a roller mill, etc. to achieve granules or particles of a desired size range. The granules release the active ingredients to the surrounding medium at a rate which is a function of particle size as well as composition and physical properties (i.e., type of foam). Thus, a control on active ingredient release characteristics through the particle size of the preparation is possible.

In total, the nature of the components of the polyurethane mixture, the degree of chelate loading in the composition, and control of cell size and structure permit the formulation of foam products even of specific gravities suitable for spray applications.

In passing, it is noteworthy that the polyurethane in its own right provides a measure of nutrient and adds some soil conditioning effect. Thus, the entire composition of chelate and resin carrier is functional instead of being merely an active ingredient in an inert carrier.

The compositions of the instant invention provide for slow steady release of the active ingredients under all soil conditions. Their use eliminates the possibility of burning the plant through an accidental over-accumulation of the active ingredients. These compositions can be formulated in a manner which permits application without the dusting problems inherent in the use of solid agricultural metal chelates; indeed the composition may be suspended in a suitable fluid, notably water, and applied through spray techniques. Importantly, the compositions of the instant invention are explicitly intended for preparation according to the needs of localized conditions. These compositions are economic in their preparaiton and use by virtue of the high concentration of active ingredients present because high concentration permits an extremely light dusting or spraying; alternatively, an extreme dilution in a mixed fertilizer formulation can be employed.

For further understanding of the instant invention, reference is now made to the following examples which serve to illustrate the same, but which should not be construed in a limiting sense.

*Example I*

To a mixture of 60 g. of quadrol (N,N$^1$-tetra-β-hydroxyethylethylenediamine) containing 23.7 g. of Freon 113 (1,1,2-trichloro-1,2,2-trifluoroethane) and 0.1 g. of L-520, silicone stabilizer was added 135 g. of Ferric Chel 138 (ferric chelate of N,N$^1$-di-orthohydroxyphenylacetic acid ethylenediamine) powder. The mixture was stirred to a homogenous paste. To the paste was added 51 g. of toluene diisocyanate. The combination was rapidly mixed until homogeneous. A vigorous exothermic reaction took place with formation of a typical high density rigid polyurethane foam. After eight hours of drying at ambient temperature, the foam could be readily cut, ground or milled to any desired particle size. This is a typical composition of 50% active ingredient loading.

Instead of Ferric Chel 138, the same quantity of 138 Fe Acid-Amide was employed in the above formulation, i.e., the ferric chelate of ethylene bis (alpha-imino-orthohydroxyphenylacetic acid)-monoamide.

*Example II*

A monogeneous suspension of 60 g. of quadrol, 40 g. castor oil, 20 g. dialyllphthalate, 0.5 g. water and 188 g. of the ferric chelate of ethylenediamine tetracetic acid was blended with 67 g. of toluene diisocyanate. As in the previous example, the ensuing spontaneous reaction produced a polyurethane foam. This foam was readily broken into granular particles suitable for the objective of this invention.

*Example III*

A mixture of 30 g. of castor oil, 0.5 g. of EL-719, a surfactant, 1 g. of ethyl cellulose, 10 g. of quadrol, 5 g. of glyceryl monorincinoleate, 0.5 g. of water and 127 g. of the ferric chelate of β hydroxyethyl ethylenediamine tracetic acid was blended with 75 g. of toluene diisocyanate. Following the exothermic reaction, the foam was pulverized in a hammer mill to a fine powder. The powder with a specific gravity of 1.0 proved an easily sprayed aqueous suspension for spray application.

Employing the same quantities and procedure, 110 g. of the ferric chelate of NTA (nitrile tri-acetic acid) was incorporated in the polyurethane foam.

*Example IV*

By the procedure of Example I using 162 g. of the ferric chelate of DTPA (diethylenetriaminepentaacetic acid) a 60% active ingredient Fe DTPA granulated product was prepared. Similarly a 60% active ingredient Fe DHEEDTA (dihydroxyethylethylenediamine triacetic acid) granulated product was prepared.

*Example V*

By the procedure of Example III the addition of 148 g. of the zinc chelate of ethylenediaminetetraacetic acid provided a 60% by weight zinc chelate product. Similarly, the copper, cobalt and manganese chelates were incorporated in the polyurethane foam.

Using the procedure of Example III, 120 g. of the zinc chelate of nitrilo triacetic acid was incorporated in the polyurethane foam.

The iron chelate foam products of Examples I to IV were lightly dusted at the rate of 5 lbs. of foam per acre over a citrus grove (oranges) known to be suffering severely from chlorosis (resulting from an iron deficiency in the soil). The trees responded to this treatment almost immediately. Throughout the growing season, the trees evidenced a continuing supply of iron, demonstrating that the foam gradually released its iron content. Elution tests made on the products of Examples I to IV indicated that the foam containing 138 Fe Acid-Amide released the chelate at the most uniform rate.

In similar tests the products of Example V, i.e., copper chelate for onions and zinc chelate for corn, applied to plants, successfully overcame trace element deficiencies throughout the growing season.

The foregoing examples have been presented for illustrative purposes only and numerous changes can be made in the proportions, conditions and ingredients set forth without departing from the spirit of the invention as defined in the appended claims.

What is claimed is:

1. A micronutrient fertilizer composition adapted to release micronutrient throughout the growing season of a plant consisting essentially of a polyurethane foam containing dispersed therein from 25% to 75% by weight of the composition of an agricultural metal chelate, the polyurethane forming a protective cover around the metal chelate, the chelating compound of the metal chelate being a synthetic amino acid selected from the group consisting of ethylene diamine tetraacetic acid, N-$\beta$ hydroxyethylethylenediamine triacetic acid, N,N' diortho hydroxy phenyl acetic acid ethylene diamine, and diethylene triamine pentacetic acid, dihydroxyethyl ethylene diamine diacetic acid, nitrilo triacetic acid, and ethylene bis (alpha-imino-ortho-hydroxyphenyl acetic acid) - monoamide.

2. A micronutrient fertilizing composition adapted to slowly release the micronutrient throughout the growing season of a plant consisting essentially of a polyurethane foam containing dispersed therein the ferric chelate of N-$\beta$ hydroxy ethylethylenediaminetriacetic acid in an amount ranging from 25% to 75% by weight of the composition, the polyurethane forming a protective coating around the chelate.

3. A micronutrient fertilizing composition adapted to slowly release the micronutrient throughout the growing season of a plant consisting essentially of a polyurethane foam containing dispersed therein the ferric chelate of ethylenediaminetetracetic acid in an amount ranging from 25% to 75% by weight of the composition, the polyurethane forming a protective coating around the chelate.

4. A micronutrient fertilizing composition adapted to slowly release the micronutrient throughout the growing season of a plant consisting essentially of a polyurethane foam containing dispersed therein the ferric chelate of N, N' diortho phenyl acetic acid ethylenediamine, in an amount ranging from 25% to 75% by weight of the composition, the polyurethane forming a protective coating around the chelate.

5. A micronutrient fertilizing composition adapted to slowly release the micronutrient throughout the growing season of a plant consisting essentially of a polyurethane foam containing dispersed therein the ferric chelate of diethylene triamine pentaacetic acid, in an amount ranging from 25% to 75% by weight of the composition, the polyurethane forming a protective coating around the chelate.

6. A micronutrient fertilizing composition adapted to slowly release the micronutrient throughout the growing season of a plant consisting essentially of a polyurethane foam containing dispersed therein the zinc chelate of ethylene diamine tetraacetic acid in an amount ranging from 25% to 75% by weight of the composition, the polyurethane forming a protective coating around the chelate.

7. A micronutrient fertilizer composition adapted to slowly release the micronutrient throughout the growing season of a plant consisting essentially of a polyurethane foam containing dispersed therein the ferric chelate of ethylene bis (alpha-imino-ortho-hydroxy-phenyl acetic acid)-monoamide in an amount ranging from 25% to 75% by weight of the composition, the polyurethane forming a protective coating around the chelate.

References Cited by the Examiner

UNITED STATES PATENTS

| | | | |
|---|---|---|---|
| 2,891,854 | 6/1959 | Kroll et al. | 71—1 |
| 2,931,716 | 4/1960 | Kelley et al. | |
| 2,933,462 | 4/1960 | Fischer. | |
| 2,988,441 | 6/1961 | Pruitt | 71—1 |
| 3,067,542 | 12/1962 | O'Brien. | |

FOREIGN PATENTS 784,508  10/1957  Great Britain.

DONALL H. SYLVESTER, *Primary Examiner.*

ANTHONY SCIAMANNA, *Examiner.*